United States Patent
Virk

(10) Patent No.: US 12,067,034 B2
(45) Date of Patent: Aug. 20, 2024

(54) SYSTEM FOR MANAGING DATABASE HAVING RECORDS WITH VARYING NUMBER OF FIELDS

(71) Applicant: Toyota Motor Engineering & Manufacturing North America, Inc., Plano, TX (US)

(72) Inventor: Raman Virk, Mississauga (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 81 days.

(21) Appl. No.: 17/377,756

(22) Filed: Jul. 16, 2021

(65) Prior Publication Data

US 2023/0018268 A1    Jan. 19, 2023

(51) Int. Cl.
  *G06F 16/28* (2019.01)
  *G06F 16/22* (2019.01)
  *G06F 16/2457* (2019.01)
  *G06F 16/248* (2019.01)

(52) U.S. Cl.
  CPC ........ *G06F 16/287* (2019.01); *G06F 16/2282* (2019.01); *G06F 16/24573* (2019.01); *G06F 16/248* (2019.01)

(58) Field of Classification Search
  None
  See application file for complete search history.

(56) References Cited

U.S. PATENT DOCUMENTS

| | | | |
|---|---|---|---|
| 4,945,475 A * | 7/1990 | Bruffey | G06F 16/13 715/255 |
| 7,752,226 B1 | 7/2010 | Harmer et al. | |
| 8,983,919 B2 | 3/2015 | Gislason | |
| 9,934,257 B2 * | 4/2018 | Agrwal | G06F 16/21 |
| 9,940,026 B2 * | 4/2018 | Leidel | G06F 3/0605 |
| 10,067,931 B2 | 9/2018 | Desai et al. | |
| 2013/0124701 A1 | 5/2013 | Klatt et al. | |
| 2020/0073809 A1 * | 3/2020 | Trout | G06F 12/0897 |

(Continued)

OTHER PUBLICATIONS

Eustace, "Ireland Invention Application Publication", 1991 (Year: 1991).*

(Continued)

*Primary Examiner* — Dawaune A Conyers
(74) *Attorney, Agent, or Firm* — Christopher G. Darrow; DARROW MUSTAFA PC

(57) ABSTRACT

A system for managing a database having records with a varying number of fields can include a processor and a memory. The memory can store a determination module and an allocation module. The determination module can include instructions that when executed by the processor cause the processor to determine a category of content in a first field of a record of the database. The allocation module can include instructions that when executed by the processor cause the processor to cause, in response to the category being: (1) a first category, a count of other fields of the record to be a first number and (2) a second category, the count of the other fields of the record to be a second number. The system can allocate a group of memory cells for each field included in a corresponding record of the database, rather than for each field of each record.

10 Claims, 3 Drawing Sheets

(56) References Cited

U.S. PATENT DOCUMENTS

2021/0200895 A1\* 7/2021 Brazeau ............... H04L 63/102
2022/0326880 A1\* 10/2022 Cook ................... G06F 3/0673

OTHER PUBLICATIONS

Scott Brandt, "File Naming Conventions—Data Management for Undergraduate Researchers—Library Guides at Purdue University Libraries," Purdue University, 3 pages, Jun. 12, 2017.
Unknown, "Document management system" 8 pages, last accessed on Jul. 10, 2021, found at https://en.wikipedia.org/wiki/Document_management_system.
Unknown, "Requirements traceability" 6 pages, last accessed on Jun. 15, 2021, found at https://en.wikipedia.org/wiki/Requirements_traceability.
Unknown, "Decision matrix" 2 pages, last accessed on Dec. 12, 2020, found at https://en.wikipedia.org/wiki/Decision_matrix.
*Enfish, LLC* v. *Microsoft Corp.*, No. 2015-1244, slip op. (Fed. Cir. May 12, 2016) 16, 30 pages.
2019 Revised Patent Subject Matter Eligibility Guidance—Advanced Module.

\* cited by examiner

400

| 402 FAE | 404 CKS | 406 ab | 408 000 | 410 <null> |
|---|---|---|---|---|
| 412 Checksheet Index | 414 R1 | 416 210706 | 418 098A | 420 <null> |
| 422 <null> | 424 <null> | 426 DMM | 428 Engine Prep Conveyor | 430 R7 |
| 432 210706 | | | | |

Conventional

| 602 FAE | 604 CKS | 606 ab | 608 000 | 610 Checksheet Index |
|---|---|---|---|---|
| 612 R1 | 614 210706 | 616 098A | 618 DMM | 620 Engine Prep Conveyor |
| 622 R7 | 624 210706 | | | |

SYSTEM FOR MANAGING DATABASE HAVING RECORDS WITH VARYING NUMBER OF FIELDS

TECHNICAL FIELD

The disclosed technologies are directed to a system for managing a database having records with a varying number of fields.

BACKGROUND

A database can be an organized collection of data that can be stored in memory cells and that can be accessed through memory control circuitry controlled by a processor. A database management system can be software that can be operated by the processor so that applications and end users can interact with the memory cells of the database. The database management system can be configured so that the data stored in the memory cells can mimic, in interactions with the applications and the end users, being organized into one or more tables. A table can be a collection of data in which a set of one or more items of data related to one or more entities can be arranged. An item of data can be represented as a field (i.e., a column) in the table. An entity can be represented as a record (i.e., a row) in the table. The record can have one or more fields. The database management system can be configured to: (1) create a record to store data for an entity, (2) write data to one or more fields of a record, (3) read data from one or more fields of a record, and (4) delete a record. A database can be used by an organization to support a variety of activities including, for example, managing documents. In an implementation in which the database is used to manage documents, one or more items of data related to a document can be written to one or more fields of a record for the document.

SUMMARY

A system for managing a database having records with a varying number of fields can include a processor and a memory. The memory can store a determination module and an allocation module. The determination module can include instructions that when executed by the processor cause the processor to determine a category of content in a first field of a record of the database. The allocation module can include instructions that when executed by the processor cause the processor to cause, in response to the category being: (1) a first category, a count of other fields of the record to be a first number and (2) a second category, the count of the other fields of the record to be a second number.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 is a diagram that illustrates an example of an array of memory cells produced by a conventional database management system to store the table of the database.

FIG. 6 is a diagram that illustrates an example of an array of memory cells produced by the system for managing the database having the records with the varying number of fields, according to the disclosed technologies.

DETAILED DESCRIPTION

The disclosed technologies are directed to a system for managing a database having records with a varying number of fields. The system can determine a category of a content in a first field of a record of the database. In response to the category being a first category, a count of other fields of the record can be caused to be a first number. In response to the category being a second category, the count of the other fields of the record can be caused to be a second number. Accordingly, the system can allocate a group of memory cells for each field included in a corresponding record of the database, rather than for each field of each record of the database.

Figure 1:
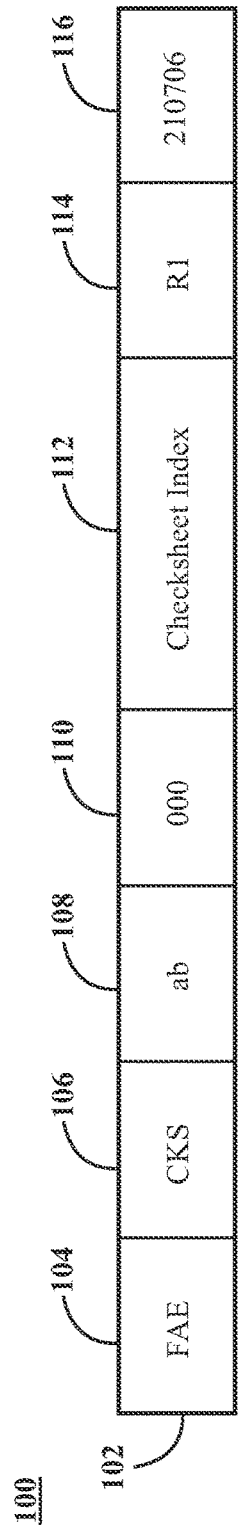
FIG. 1 is a diagram that illustrates an example of a record, of a database, associated with a first category.

FIG. 1 is a diagram that illustrates an example of a record 102, of a database 100, associated with a first category. For example, the record 102 can be for one or more items of data related to a document used by an organization. The document can be associated with the first category. For example, the first category can be a controlled document. For example, a controlled document can be a reference document for the organization intended to be filed (or filed) in a knowledge library of the organization. For example, the record 102 can include a first field 104, a second field 106, a third field 108, a fourth field 110, a fifth field 112, a sixth field 114, and a seventh field 116. For example: (1) a content type of the first field 104 can be a purpose, (2) a content type of the second field 106 can be a control type, (3) a content type of the third field 108 can be a group number, (4) a content type of the fourth field 110 can be an index number, (5) a content type of the fifth field 112 can be a description, (6) a content type of the sixth field 114 can be a revision number, and (7) a content type of the seventh field 116 can be a date.

Figure 2:
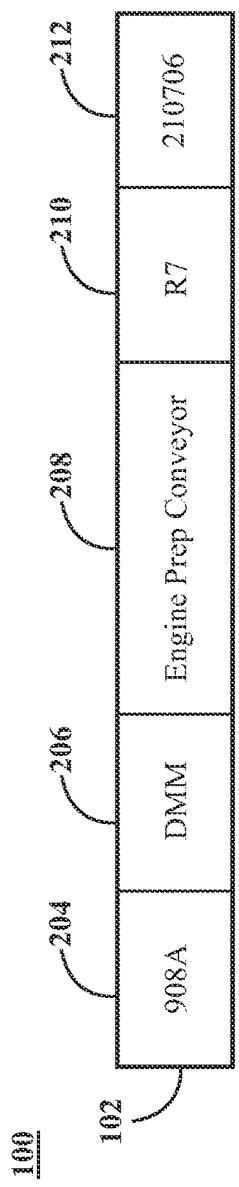
FIG. 2 is a diagram that illustrates an example of a record, of the database, associated with a second category.

FIG. 2 is a diagram that illustrates an example of a record 202, of the database 100, associated with a second category. For example, the record 202 can be for one or more items of data related to a document used by an organization. The document can be associated with the second category. For example, the second category can be an uncontrolled document. For example, an uncontrolled document can be a project-specific document for the organization not intended to be filed (or not filed) in the knowledge library of the organization. For example, the record 202 can include a first field 204, a second field 206, a third field 208, a fourth field 210, and a fifth field 212. For example: (1) the content type of the first field 204 can be the purpose, (2) a content type of the second field 206 can be a document type, (3) the content type of the third field 208 can be the description, (4)

the content type of the fourth field 210 can be the revision number, and (5) the content type of the fifth field 212 can be the date.

Figure 3:
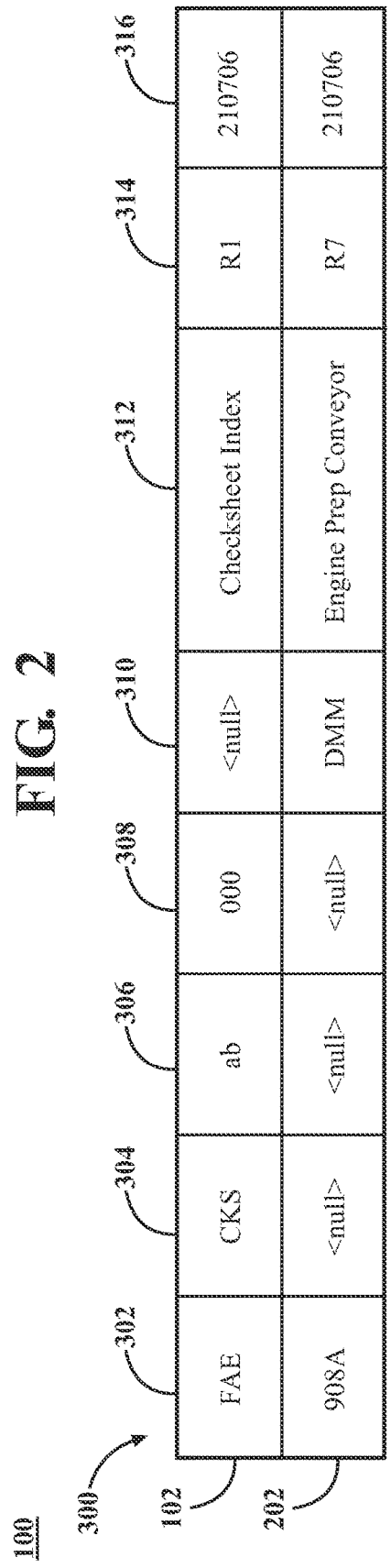
FIG. 3 is a diagram that illustrates an example of a table of the database.

FIG. 3 is a diagram that illustrates an example of a table 300 of the database 100. For example, the table 300 can include the record 102 and the record 202. For example, the table 300 can include a first field 302, a second field 304, a third field 306, a fourth field 308, a fifth field 310, a sixth field 312, a seventh field 314, and an eighth field 316. For example: (1) the content type of the first field 302 can be the purpose, (2) the content type of the second field 304 can be the control type, (3) the content type of the third field 306 can be the group number, (4) the content type of the fourth field 308 can be the index number, (5) the content type of the fifth field 310 can be the document type, (6) the content type of the sixth field 312 can be the description, (7) the content type of the seventh field 314 can be the revision number, and (8) the content type of the eighth field 316 can be the date.

The first field 302 (having the content type about the purpose), the sixth field 312 (having the content type about the description), the seventh field 314 (having the content type about the revision number), and the eighth field 316 (having the content type about the date) can be included in both the record 102 and the record 202. However, the second field 304 (having the content type about the control type), the third field 306 (having the content type about the group number), and the fourth field 308 (having the content type about the index number) can be included in only the record 102 and a content of these fields for the record 202 can be a null value. Likewise, the fifth field 310 (having the content type about the document type) can be included in only the record 202 and a content of this field for the record 102 can be the null value.

FIG. 4 is a diagram that illustrates an example of an array of memory cells 400 produced by a conventional database management system to store the table 300 of the database 100. For example, the conventional database management system can allocate a group of memory cells for each field of each record of a database. With reference to FIGS. 3 and 4, for example: (1) a group 402 can be allocated for the first field 302 of the record 102, (2) a group 404 can be allocated for the second field 304 of the record 102, (3) a group 406 can be allocated for the third field 306 of the record 102, (4) a group 408 can be allocated for the fourth field 308 of the record 102, (5) a group 410 can be allocated for the fifth field 310 of the record 102, (6) a group 412 can be allocated for the sixth field 312 of the record 102, (7) a group 414 can be allocated for the seventh field 314 of the record 102, (8) a group 416 can be allocated for the eighth field 316 of the record 102, (9) a group 418 can be allocated for the first field 302 of the record 202, (10) a group 420 can be allocated for the second field 304 of the record 202, (11) a group 422 can be allocated for the third field 306 of the record 202, (12) a group 424 can be allocated for the fourth field 308 of the record 202, (13) a group 426 can be allocated for the fifth field 310 of the record 202, (14) a group 428 can be allocated for the sixth field 312 of the record 202, (15) a group 430 can be allocated for the seventh field 314 of the record 202, and (16) a group 432 can be allocated for the eighth field 316 of the record 202.

Figure 5:
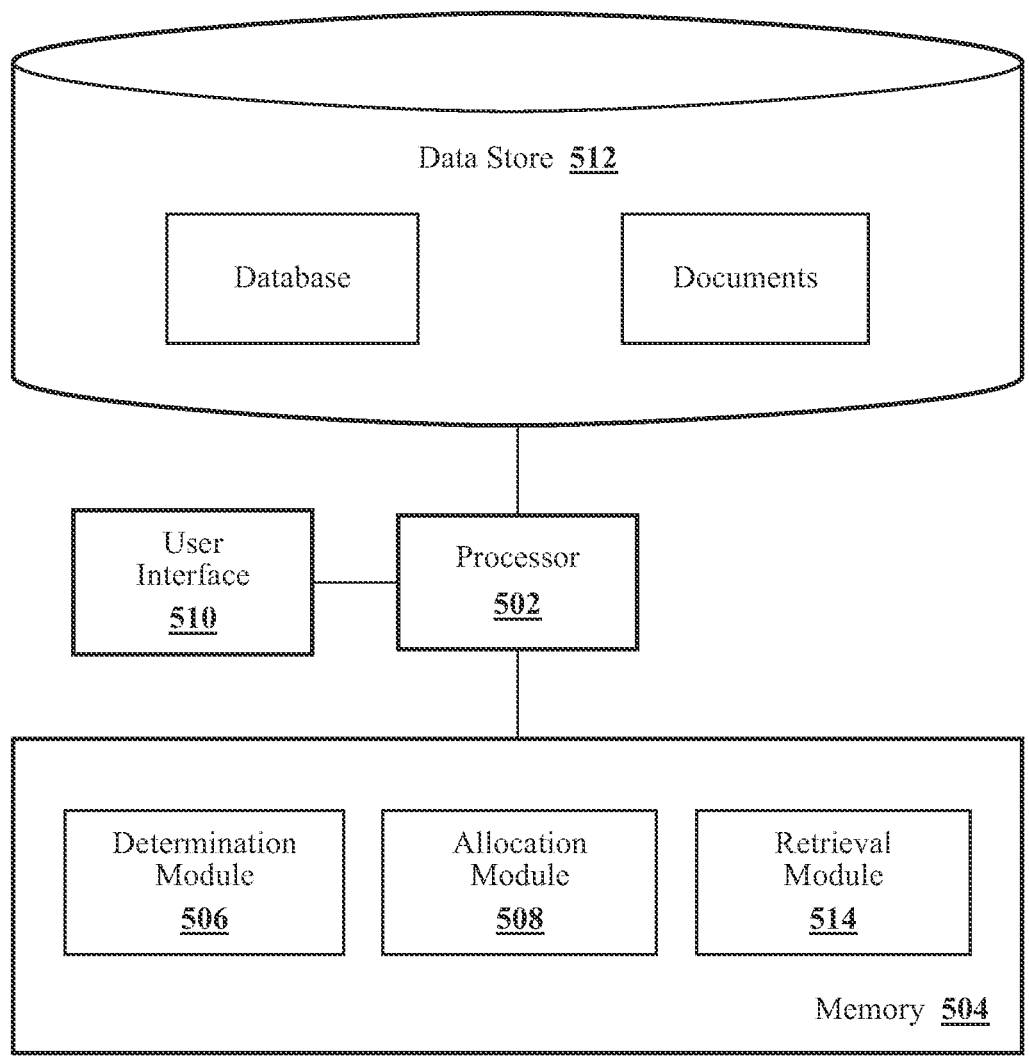
FIG. 5 is a block diagram that illustrates an example of a system for managing a database having records with a varying number of fields, according to the disclosed technologies.

FIG. 5 is a block diagram that illustrates an example of a system 500 for managing a database having records with a varying number of fields, according to the disclosed technologies. The system 500 can include, for example, a processor 502 and a memory 504. The memory 504 can be communicably coupled to the processor 502. For example, the memory 504 can store a determination module 506 and an allocation module 508.

The system 500 can be configured to create a record for the database. The determination module 506 can include instructions that function to control the processor 502 to determine a category of a content in a first field of the record of the database. For example, the instructions to determine the category can include instructions to compare a value of the content to a specific value. For example, if the value of the content is equal the specific value, then the category can be the first category; otherwise the category can be the second category. With reference to FIG. 3, for example, if the specific value is "FAE", then because: (1) the value of the content in the first field 302 of the record 102 (i.e., "FAE") is equal to the specific value (i.e., "FAE"), the category of the content in the first field 302 of the record 102 can be the first category and (2) the value of the content in the first field 302 of the record 202 (i.e., "908A") is not equal to the specific value (i.e., "FAE"), the category of the content in the first field 302 of the record 202 can be the second category.

Returning to FIG. 5, the allocation module 508 can include instructions that function to control the processor 502 to cause, in response to: (1) the category being a first category, a count of other fields of the record to be a first number and (2) the category being a second category, the count of the other fields of the record to be a second number. With reference to FIG. 3, for example, because: (1) the category of the record 102 is the first category, then the count of the other fields of the record 102 can be six and (2) the category of the record 202 is the second category, then the count of the other fields of the record 202 can be four. For example, the count of the other fields of the record 102 can include: (1) the second field 304 (having the content type about the control type), (2) the third field 306 (having the content type about the group number), (3) the fourth field 308 (having the content type about the index number), (4) the sixth field 312 (having the content type about the description), (5) the seventh field 314 (having the content type about the revision number), and (6) the eighth field 316 (having the content type about the date). For example, the count of the other fields of the record 202 can include: (1) the fifth field 310 (having the content type about the document type), (2) the sixth field 312 (having the content type about the description), (3) the seventh field 314 (having the content type about the revision number), and (4) the eighth field 316 (having the content type about the date).

FIG. 6 is a diagram that illustrates an example of an array of memory cells 600 produced by the system 500 for managing the database having the records with the varying number of fields, according to the disclosed technologies. For example, the system 500 can allocate a group of memory cells for each field included in a corresponding record of the database. With reference to FIGS. 3 and 6, for example: (1) a group 602 can be allocated for the first field 302 of the record 102, (2) a group 604 can be allocated for the second field 304 of the record 102, (3) a group 606 can be allocated for the third field 306 of the record 102, (4) a group 608 can be allocated for the fourth field 308 of the record 102, (5) a group 610 can be allocated for the sixth field 312 of the record 102, (6) a group 612 can be allocated for the seventh field 314 of the record 102, (7) a group 614 can be allocated for the eighth field 316 of the record 102, (8) a group 616 can be allocated for the first field 302 of the record 202, (9) a group 618 can be allocated for the fifth field 310 of the record 202, (10) a group 620 can be allocated for the sixth field 312 of the record 202, (11) a group 622 can be allocated for the seventh field 314 of the record 202, and (12) a group 624 can be allocated for the eighth field 316 of the record 202.

Returning to FIG. 5, in a first configuration, the system 500 can further include a user interface 510. The user interface 510 can be communicably coupled to the processor 502. The user interface 510 can be configured to communicate a signal, input by a user, to the processor 202. For example, in conjunction with a creation of a record of the database, the signal can include a content to be included in a field of the record. For example, a value of the signal can be one of a finite number of pre-determined values. For example, the user interface 510 can include one or more graphical control elements. For example, the one or more graphical control elements can be configured to produce the signal. The one or more graphical control elements can include, for example, a button, a radio button, a check box, a split button, a cycle button, a slider, a list box, a spinner, a drop-down list, a menu, a context menu, a pie menu, a menu bar, a tool bar, a ribbon, a combo box, a text box, or the like.

In a second configuration, the allocation module 508 can further include instructions that function to control the processor 502 to cause, in response to: (1) the category being the first category, a content type of a field of the other fields of the record to be a first content type and (2) the category being the second category, the content type of the field of the other fields of the record to be a second content type. With reference to FIG. 3, for example, because the category of the record 102 is the first category, the allocation module 508 can cause: (1) the first content type of the second field 304 of the record 102 to be about the control type, (2) the first content type of the third field 306 of the record 102 to be about the group number, (3) the first content type of the fourth field 308 of the record 102 to be about the index number, (4) the first content type of the sixth field 312 of the record 102 to be about the description, (5) the first content type of the seventh field 314 of the record 102 to be about the revision number, and (6) the first content type of the eighth field 316 of the record 102 to be about the date. Likewise, for example, because the category of the record 202 is the second category, the allocation module 508 can cause: (1) the second content type of the fifth field 310 of the record 202 to be about the document type, (2) the second content type of the sixth field 312 of the record 202 to be about the description, (3) the second content type of the seventh field 314 of the record 202 to be about the revision number, and (4) the second content type of the eighth field 316 of the record 202 to be about the date.

For example, one or more of the first content type or the second content type can be a control type, a group number, an index number, a document type, a description, a revision number, or a date. For example, the control type can include a standard, a form, a checksheet, a quality data sheet, a procedure document, or a training document.

For example, the second content type can be the first content type. For example: (1) the first content type of the sixth field 312 of the record 102 and the second content type of the sixth field 312 of the record 202 can both be about the description, (2) the first content type of the seventh field 314 of the record 102 and the second content type of the seventh field 314 of the record 202 can both be about the revision number, and (3) the content type of the eighth field 316 of the record 102 and the second content type of the eighth field 316 of the record 202 can both be about the date.

Returning to FIG. 5, in a third configuration, the allocation module 508 can further include instructions that function to control the processor 502 to cause, in response to the category being the first category: (1) a content type of a first field of the other fields of the record to be a first content type and (2) the content type of a second field of the other fields of the record to be a second content type. With reference to FIG. 3, for example, because the category of the record 102 is the first category, the allocation module 508 can cause: (1) the content type of the second field 304 of the record 102 can be the first content type, which can be about the control type, (2) the content type of the third field 306 of the record 102 can be the second content type, which can be about the group number, (3) the content type of the fourth field 308 of the record 102 can be a third content type, which can be about the index number, (4) the content type of the sixth field 312 of the record 102 can be a fourth content type, which can be about the description, (5) the content type of the seventh field 314 of the record 102 can be a fifth content type, which can be about the revision number, and (6) the content type of the eighth field 316 of the record 102 can be a sixth content type, which can be about the date. Likewise, for example, because the category of the record 202 is the second category, the allocation module 508 can cause: (1) the content type of the fifth field 310 of the record 202 can be the first content type, which can be about the document type, (2) the content type of the sixth field 312 of the record 202 can be the second content type, which can be about the description, (3) the content type of the seventh field 314 of the record 202 can be the third content type, which can be about the revision number, and (4) the content type of the eighth field 316 of the record 202 can be the fourth content type, which can be about the date.

Returning to FIG. 5, in a variation of the third configuration: (1) the first content type of the first field of the other fields of the record can be a control type and (2) the second content type of the second field of the other fields of the record can be an index number. A specific value of the index number, in the second field of the other fields of the record, can be associated with a list of documents, included in the database, associated with a value of the control type in the first field of the other fields of the record. The list of documents can include, for a document, one or more of information about an originator of the document, a revision number of the document, or a date of the document. With reference to FIG. 3, for example, if the specific value of the index number in the fourth field 308 of the record 102 is "000" and the value of the control type in the second field 304 of the record 102 is "CKS", then the record 102 can be associated with a list of checksheets included in the database 100.

Returning to FIG. 5, in a fourth configuration, the system 500 can further include a data store 512. The data store 512 can be communicably coupled to the processor 502. The data store 512 can be configured to store the database. Additionally, for example, the data store 512 can be configured to store documents. For example, the memory 504 can further store a retrieval module 514. The retrieval module 514 can include instructions that function to control the processor 502 to retrieve, based on a value in a field of records in the database, a record having the value in the field. Additionally, for example, the retrieval module 514 can further include instructions that function to control the processor 502 to retrieve a document associated with the record having the value in the field. With reference to FIG. 3, for example, if the value the fourth field 308 of the records in the database 100 is "000", then the record 102 can be retrieved. In another example, if the value of the eighth field 316 of the records in the database 100 is "210706", then both the record 102 and the record 202 can be retrieved.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 5, and 6 but the embodiments are not limited to the illustrated structure or application.

The block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor;
a user interface configured to communicate a signal, input by a user and in conjunction with a creation of a record of a database, to the processor, the signal including a content to be included in a field of the record; and
a memory storing:
a determination module including instructions that when executed by the processor cause the processor to determine that a category of the content, included in the signal, in a first field of the record is one of a first category and a second category; and
an allocation module including instructions that when executed by the processor cause the processor to:
cause, in response to a determination that the category of the content, included in the signal, in the first field of the record is:
the first category, a count of other fields of the record to be a first number; and
the second category, the count of the other fields of the record to be a second number; and
allocate, in response to the category being:
the first category, a group of memory cells for the first field and for each of the first number of the other fields and refrain from allocating a group of memory cells for any field excluded from fields associated with the first category; and
the second category, a group of memory cells for the first field and for each of the second number of the other fields and refrain from allocating a group of memory cells for any field excluded from fields associated with the second category.

2. The system of claim 1, wherein the instructions to determine the category include instructions to compare a value of the content to a specific value.

3. The system of claim 1, wherein the user interface includes a graphical control element configured to produce the signal.

4. The system of claim 1, wherein the allocation module further includes instructions that when executed by the processor cause the processor to cause, in response to the category of the content, included in the signal, in the first field of the record being:
the first category, a content type of a field of the other fields of the record to be a first content type; and
the second category, the content type of the field of the other fields of the record to be a second content type.

5. The system of claim 4, wherein at least one of the first content type or the second content type is a control type, a group number, an index number, a document type, a description, a revision number, or a date.

6. The system of claim 4, wherein the second content type is the first content type.

7. The system of claim 1, wherein the allocation module further includes instructions that when executed by the processor cause the processor to cause, in response to the category of the content, included in the signal, in the first field of the record being the first category:
a content type of a first field of the other fields of the record to be a first content type; and
the content type of a second field of the other fields of the record to be a second content type.

8. The system of claim 7, wherein:
the first content type is a control type,
the second content type is an index number, and
a specific value of the index number is associated with a list of documents, included in the database, associated with a value of the control type.

9. The system of claim 1:
further comprising a data store, the data store coupled to the processor and configured to store the database,
wherein the memory further stores a retrieval module including instructions that when executed by the processor cause the processor to retrieve, based on a value in a field of records in the database, a record having the value in the field.

10. The system of claim 1, wherein a value of the signal is one of a finite number of pre-determined values.

* * * * *